United States Patent [19]

Wagstaff

[11] Patent Number: 4,479,422
[45] Date of Patent: Oct. 30, 1984

[54] SLIDING AND PIVOTING INVERTIBLE GRILL

[76] Inventor: Alvin J. Wagstaff, 504 Lawrence Ave., Lafayette, La. 70503

[21] Appl. No.: 384,973

[22] Filed: Jun. 4, 1982

[51] Int. Cl.³ ............................................ A47J 37/04
[52] U.S. Cl. ...................................... 99/395; 99/398; 99/402; D7/409
[58] Field of Search ................. 99/395, 396, 397, 398, 99/402, 427, 449; D7/332, 337, 402, 409, 411

[56] References Cited

U.S. PATENT DOCUMENTS

| | | | |
|---|---|---|---|
| 870,117 | 11/1907 | Miller | 99/398 |
| 1,108,553 | 8/1914 | Copeman | 99/395 |
| 1,465,007 | 8/1923 | Sjolin | 99/398 |
| 1,532,184 | 4/1925 | Kahn | 99/398 |
| 1,714,064 | 5/1929 | Warner | 99/398 |
| 2,316,620 | 4/1943 | Rees | 99/426 |
| 2,760,428 | 8/1956 | Boyajian | 99/427 |

*Primary Examiner*—Billy J. Wilhite
*Assistant Examiner*—Christine A. Peterson
*Attorney, Agent, or Firm*—Harvey B. Jacobson

[57] ABSTRACT

A base is provided including opposite ends and opposite side guide assemblies extending between the opposite ends. A pair of grill panels are provided and include first and second corresponding remote marginal portions and pivot structure is provided pivotally connecting the first marginal portions together for relative angular displacement of the grill panels. In addition, a first marginal portion of one of the grill panels includes follower structure slidably engaged with the opposite side guide assemblies of the base for sliding and pivotal movement relative thereto and the opposite side guide assemblies include elongated guide members extending generally normal thereto with which corresponding side portions of the second grill panel are slidably engaged. The second marginal portions of the grill panels include coacting latch structures for releasably securing the second marginal portions together and the latch structure and pivot structure are operative to support the corresponding first and second marginal portions of the grill panels in adjusted spaced relation relative to each other.

13 Claims, 6 Drawing Figures

SLIDING AND PIVOTING INVERTIBLE GRILL

BACKGROUND OF THE INVENTION

When cooking on a grill over burning charcoal, gas burner heated ceramic briquettes or other heating means it is usually necessary to turn the meat or other food being broiled and such turning is often difficult for various reasons. Accordingly, a need exists for a grill constructed in a manner whereby the meat or other food thereon may be more readily turned.

In addition, when grilling food it is sometimes difficult to properly position the food on the grill if the grill is positioned over the cooking heat. Accordingly, a further need exists for a grill constructed in a manner such that the food or meat supporting portion thereof may be readily shifted out of registry with the cooking heat.

Examples of various different forms of grills and similar structures including some of the general structural and operational features of the instant invention are disclosed in U.S. Pat. Nos. 2,109,079, 2,681,001, 3,352,227 and 3,389,361.

BRIEF DESCRIPTION OF THE INVENTION

The grill is constructed in a manner whereby the relatively pivotal grill panels thereof may be swung to 90° relatively angularly displaced open positions with at least a major portion of the lower horizontal grill panel out of registry with an associated heat source thereby enabling meat or other food to be grilled to be placed on the lower grill panel. Thereafter, the open grill panel may be swung to the closed position and the support and grill panels include coacting structure whereby swinging of the open grill panel to the closed position will automatically displace the lower meat or other food supporting grill panel into registry with the associated heat source. The grill panels may be locked together against relative angular displacement for initial grilling of the food supported therefrom. Thereafter, when it becomes necessary to "turn" the food, the entire combination comprising the two grill panels and the food supported therebetween can be readily turned relative to the heat source.

After the cooking operation has been completed, one pair of corresponding edges of the grill panels may be released from latched engagement with each other and one of the grill panels may be swung to its open position disposed generally normal to the other grill panel while at the same time the other grill panel is automatically displaced to a position with a major portion thereof out of registry with the cooking heat.

The main object of this invention is to provide a cooking grill which will greatly facilitate the grilling of meat and other foods.

Another object of this invention is to provide a grill including a pair of grill panels between which food to be grilled may be clamped and thereby securely held in position relative to the grill panels.

Still another important object of this invention in accordance with the immediately preceding objects is to provide a grill constructed in a manner whereby all of the food clamped between the grill panels may be simultaneously "turned" relative to the cooking heat.

Yet another object of this invention is to provide a cooking grill including a pair of grill panels and with the panels being supported from one another for relative angular displacement between parallel closely juxtaposed positions and positions disposed substantially normal to each other.

Another object of this invention, in accordance with the immediately preceding objects is to provide a grill constructed in a manner whereby when one of the grill panels is swung to an open position disposed substantially normal to the other grill panel a major portion of the other grill panel will be automatically displaced to a position out of registry with the cooking heat.

A final object of this invention to be specifically enumerated herein is to provide a cooking grill in accordance with preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
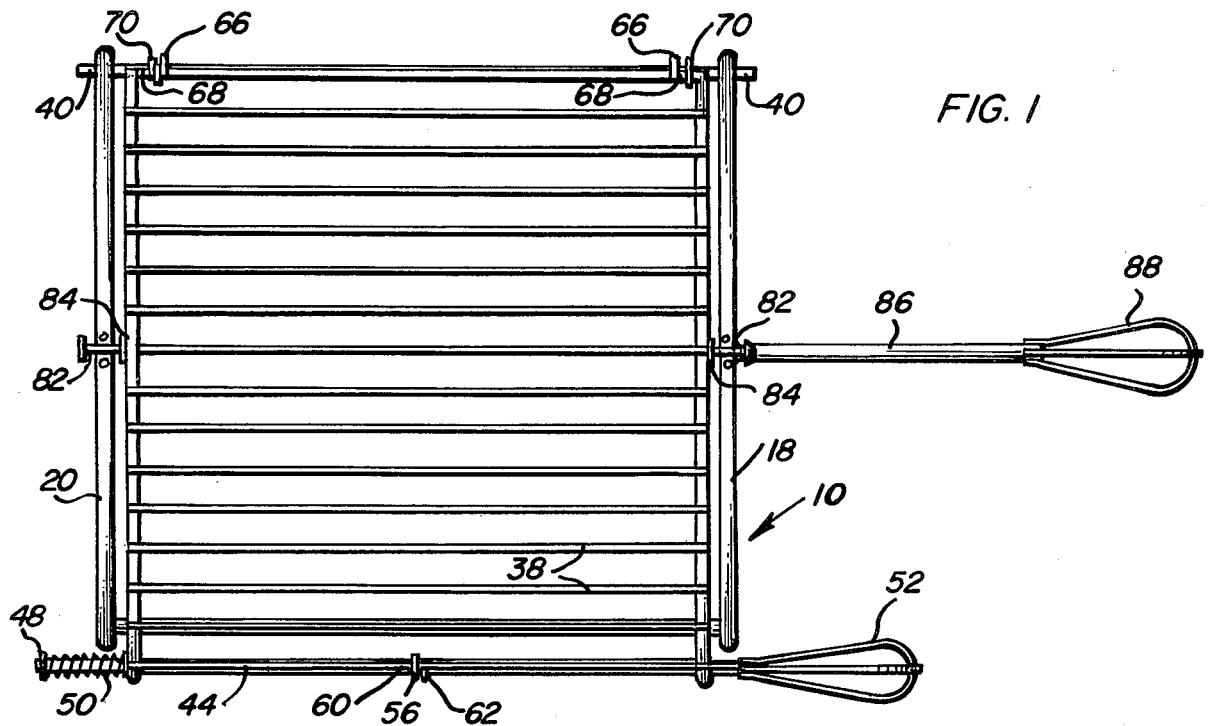
FIG. 1 is a top plan view of the grill of the instant invention.
Figure 4:
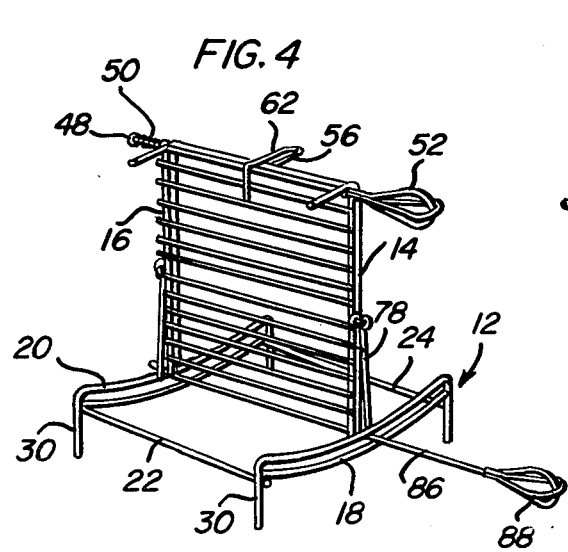
FIG. 4 is a perspective view of the grill with the grill panels thereof in an intermediate position during the turning of the grill panels between positions with opposite sides thereof registered with the underlying associated cooking heat.
Figure 5:
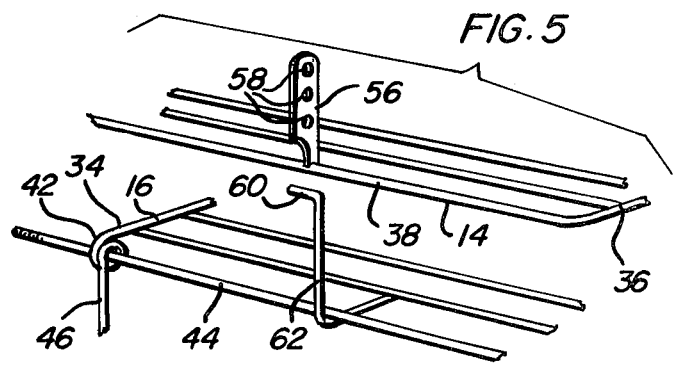
FIG. 5 is a fragmentary exploded perspective view of the latch structure of the grill panels for latching the latter against relative angular displacement in adjusted spaced relation.

Referring now more specifically to the drawings, the numeral 10 generally designates the grill of the instant invention. The grill 10 consists of a base structure referred to in general by the reference numeral 12 and a pair of grill panels 14 and 16. The base structure 12 includes a pair of opposite side frames 18 and 20 interconnected by front and rear transverse members 22 and 24 extending and connected between the front and rear ends of the side frames 18 and 24. Each of the side frames 18 and 20 includes a pair of upper and lower vertically spaced, upwardly concave and parallel front to rear extending arcuate members 26 and 28 interconnected at their corresponding front and rear ends and the front and rear ends of each of the arcuate members 26 terminates in downturned leg 30 and the lower ends of the legs 30 are adapted for support from a suitable support surface 32 such as the bottom of an upwardly opening fire pan having charcoal briquettes therein or some other suitable support surface having a cooking heat source associated therewith in a location which may be spanned by the legs 30.

Each pair of arcuate members 26 and 28 defines an arcuate guideway 31 therebetween and a first grill panel 16 includes a pair of front-to-rear extending opposite side grill bars 34 and 36 interconnected along their length by transverse grill bars 38 extending and secured therebetween. The rearmost transverse grill bar 38 of the grill panel 16 is of slightly greater diameter stock and includes extended opposite ends 40 which are slidably received in the corresponding guideways 31 and also rotatably received therein. The forward ends of the grill bars 36 of the grill panel 16 are coiled as at 42 for slidably and rotatably receiving opposite end portions of a transverse latch bar 44 and terminate in downwardly directed legs 46. One end of the latch bar 44 extends outwardly of the outer side of the guide bar 34 and has a threaded abutment nut 48 threadedly supported from its outer terminal end. In addition, a compression spring 50 is disposed about the outer end of the latch bar 44 between the abutment 48 and the outer side of the grill bar 34. The other end of the grill bar 44 projects outwardly of the outer side of the grill bar 36 and has a heat dissipating handle 52 thereon as well as an abutment disposed between the handle 52 and the outer side of the grill bar 36.

The second grill panel 14 includes an upstanding keeper bar 56 supported from the forward transverse grill bar 38 thereafter centrally intermediate its opposite ends and the keeper bar 56 includes vertically spaced transverse bores 58 formed therein in which the laterally directed upper terminal end 60 of an upstanding latch member 62 carried by the latch bar 44 is selectively engageable. In addition, the rearmost transverse grill bar 38 of the grill panel 16 includes a pair of upstanding latch members 66 similar to the latch member 62 and including oppositely directed upper ends 68 corresponding to the terminal end 60 of the latch member 62 and the rearmost transverse grill bar 38 of the grill panel 14 includes a pair of upstanding keeper bars 70 corresponding to the keeper bar 58 and including vertically spaced transverse bores 72 corresponding to the bores 58. However, the latch members 60 are not mounted on a reciprocal transverse grill bar, but rather the corresponding stationary grill bar, and are slightly flexible whereby the upper ends thereof may be biased toward each other in order to axially withdraw the upper ends 68 thereof from the corresponding bores 72 in order that the upper ends 68 may be placed in a different pair of corresponding bores 72 for adjusting the height of the grill panel 14 relative to the grill panel 16. It will be noted that the upper ends 68 are rotatably received in the corresponding bores 72 and thereby also serve to pivotally support the upper grill panel 14 from the lower grill panel 16.

The opposite side frames 18 and 20 further include inverted U-shaped guide members 78 secured to the longitudinal midportions of the arcuate members 26 and the guide member 78 define upstanding guideways 80 in which outwardly projecting guide members 82 carried by longitudinal midportions of the oppposite side grill bars 34 and 36 of the grill panel 14 are slidably received. The guide members 82 comprise threaded bolts removably threadedly engaged in nuts 84 welded or otherwise secured to the longitudinal midportions of the corresponding grill bars 34 and 36. In addition to being slidably received in the guideways 80, the guide members 82 are also rotatably received therein. The longitudinal midportion of the arcuate member 28 of the side frame 18 includes a laterally outwardly directed handle shank 86 equipped with a heat dissipating handle 88 on its outer end, the handle 88 being of generally the same configuration as the handle 52 and provided for the purpose of steadying the base structure 12.

Figure 6:
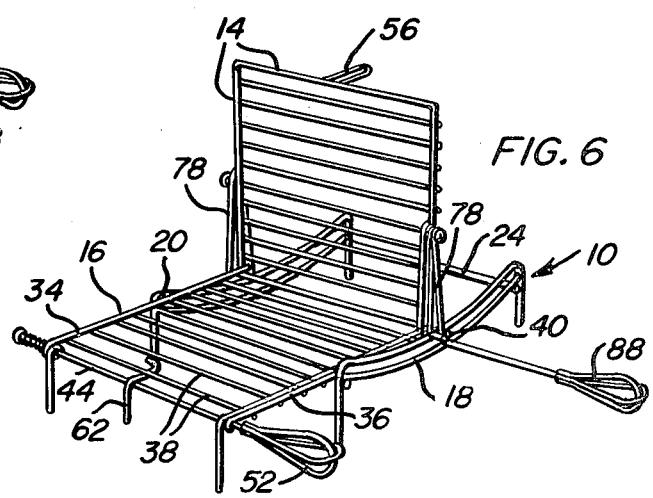
FIG. 6 is a perspective view of the grill with the upper grill panel in a vertical open position and the lower horizontal grill panel displaced laterally outwardly from the forward side of the base structure.
Figure 2:
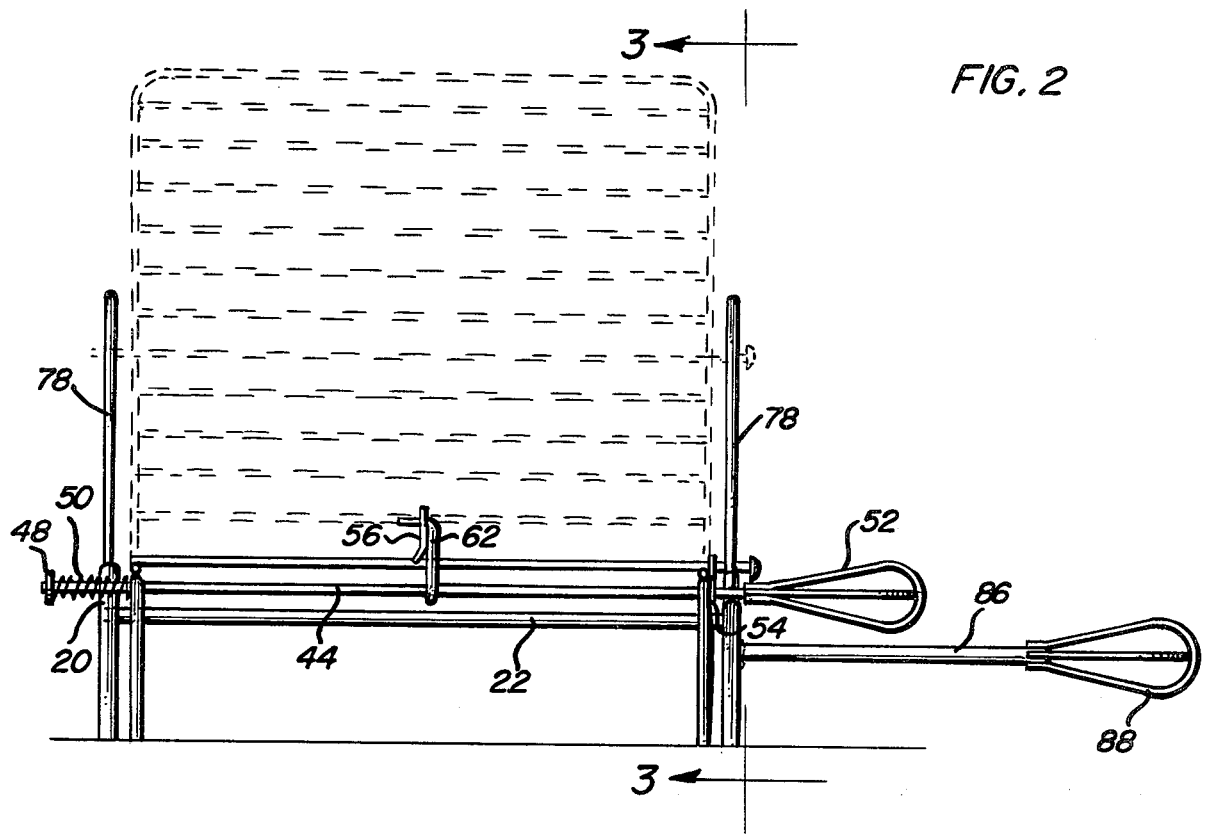
FIG. 2 is a front elevational view of the grill of the instant invention and will an alternate open position of the upper grill panel thereof illustrated in phantom lines.

In operation, the grill 10 may have its base structure 12 disposed on any suitable surface such as the surface 32 with which a cooking heat source is operatively associated and with the cooking heat source disposed between the legs 30. Then, with one hand steadying the base structure 12 through the utilization of the handle 88, the handle 52 may be grasped and displaced slightly further outwardly of the side grill bar 36 of the grill panel 16 against the biasing action of the spring 50 in order to axially withdraw the terminal end 60 of the latch member 62 from the corresponding bore 58 of the keeper bar 56. Thereafter, the forward end of the grill panel 14 may be urged upwardly whereupon the guide members 82 will slide upwardly in the guideways 80 during upward swinging movement of the guide panel 14 to the vertical position thereof illustrated in FIG. 6 and the grill panel 16 will be displaced forwardly of the base structure 12 to the position thereof illustrated in FIG. 6. Thereafter, food to be grilled may be placed upon the grill panel 16 and the grill panel 16 may be displaced back toward its original position through the utilization of the handle 52 and such rearward displacement of the grill panel 16 will cause the grill panel 14 to swing downwardly to its original position. After the grill panel 14 has been swung downwardly to a horizontal position, the handle 52 may be utilized to again engage the terminal end 60 of the latch member 62 in one of the bores 58 of the keeper bar 56 so that the grill panel 14 will be properly spaced relative to the grill panel 16 and lightly clampingly engage the food to be cooked between the panels 14 and 16. Of course, the upper ends 68 of the latch members 66 are previously set in the proper bores 72 of the keeper bars 70.

Figure 3:
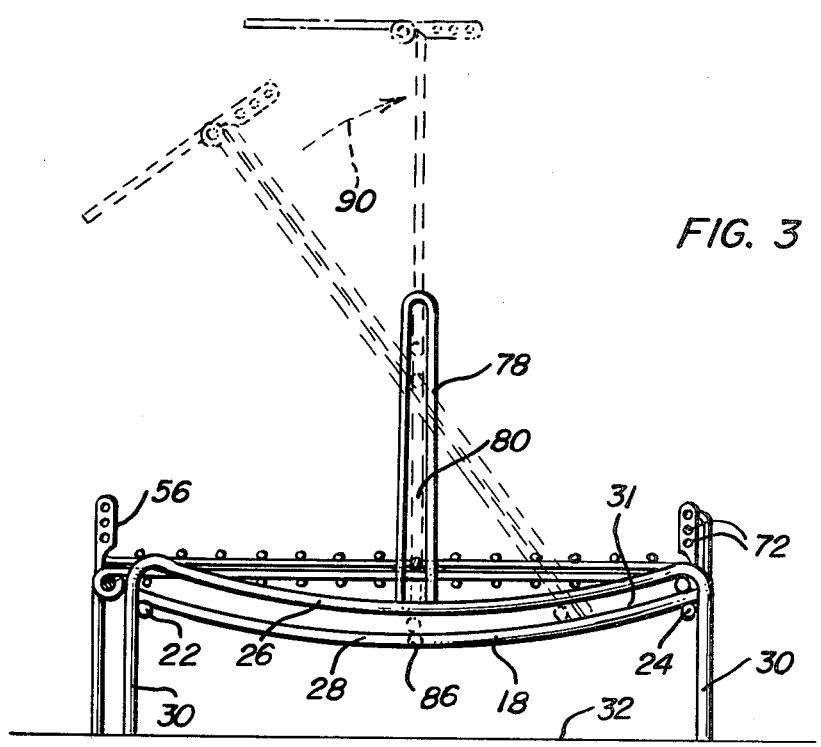
FIG. 3 is a vertical sectional view taken substantially upon the plane indicated by the section line 3—3 of FIG. 2.

After the food clamped between the grill panels 14 and 16 has been cooked on the lower side thereof, the handle 52 is swung upwardly and rearwardly whereby the grill panels 14 and 16 will swing in a clockwise direction in the manner illustrated by the phantom line arrow 90 in FIG. 3 until the grill panels 14 and 16 have been rotated substantially 180° with the grill panel 14 disposed in its lowermost position. During this movement, the guide members 82 move upwardly and downwardly in the guideway 80 and the ends 40 slide forwardly through the guideway 31. Thereafter, after the food has been cooked on the second side, the handle 52, which is now disposed at the rear of the grill 80, may again be raised in order to rotate the grill panels 14 and 16 180° in a clockwise direction returning them to their original position illustrated in solid lines in FIG. 3. Then, when it is desired to move the cooked food from between the grill panels 14 and 16, the handle 52 is again utilized to withdraw the terminal end of the latch member 62 from the associated bore 58 of the keeper bar 56 after which the forward end of grill panel 14 may again be raised to the position thereof illustrated in FIG. 6 of the drawings with the lower grill panel 16 forwardly displaced outwardly of the forward side of the base structure 12. Of course, the cooked food may then be removed from the grill panel 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A grill including a base structure for stationary support from a suitable support structure, said grill including first and second closely registered side-by-side grill panels, said grill panels including corresponding first and second remote marginal portions and said base structure including first and second remote marginal zones, the opposite ends of said first grill panel first marginal portion and said base including first coacting means slidably supporting said opposite ends from said base for shifting between said base first and second remote marginal zones and angular displacement of said first grill panel relative to said base about a first axis extending between said opposite ends, said first marginal portions of said panels including second coacting means interconnecting said panels for angular displacement relative to each other about a second axis at least closely adjacent and generally paralleling the first axis.

2. The grill of claim 1 wherein said base includes a pair of elongated generally parallel guide means intermediate said first and second marginal zones spaced apart at opposite sides of said base extending between corresponding ends of said zones and disposed at generally right angles to a plane containing said marginal zones, said second grill panel including follower means centrally intermediate the first and second marginal portions thereof guidingly engaged with said guide means for movement therealong.

3. The grill of claim 1 wherein said second coacting means includes means operative to laterally shift said second axis laterally of the medial plane of one of said grill panels.

4. The grill of claim 1 wherein said one grill panel comprises said first grill panel.

5. The grill of claim 1 wherein said first and second marginal zones are spaced laterally apart in a generally horizontal plane.

6. The grill of claim 5 wherein the second marginal portion of said first grill panel includes depending leg means whose lower portions are adapted for sliding laterally of a horizontal support surface.

7. The grill of claim 1 wherein said second coacting means includes means operative to laterally shift said second axis laterally of the medial plane of one of said grill panels, said second marginal portions of said first and second grill panels including latch structure for releasably latching said second marginal portions in adjusted laterally spaced relation.

8. A grill including a base having front-to-rear extending opposite sides, a pair of superposed grill panels including corresponding front and rear marginal portions, pivot means pivotally connecting said rear marginal portions for angular displacement of said panels relative to each other about a first axis extending along and paralleling said rear marginal portions, coacting support means carried by said sides and the opposite ends of the rear marginal portion of a first of said panels slidably and pivotally supporting the last mentioned rear marginal portion from said sides for front-to-rear guided movement therealong and angular displacement relative thereto about a second axis extending between said opposite ends.

9. The guide of claim 8 wherein said sides include elongated generally parallel guides disposed generally normal to a plane containing said sides and projecting outwardly from one side of plane, and follower means carried by one of said panels at the opposite sides thereof slidably and rotatably engaged with said guides.

10. The guide of claim 9 wherein said pivot means includes means operative to laterally shift said first axis laterally of one of said panels.

11. The guide of claim 10 including coacting latch means releasably latching front marginal portions of said panels together.

12. The guide of claim 11 wherein said coacting latch means includes means for releasably latching said front marginal portions together in selectively laterally spaced relation.

13. The guide of claim 11 wherein the front marginal portions of the lower panel includes depending leg means.

* * * * *